March 28, 1944.  T. J. CONWAY ET AL  2,345,328
FARM VEHICLE BODY
Filed June 18, 1943   2 Sheets-Sheet 1
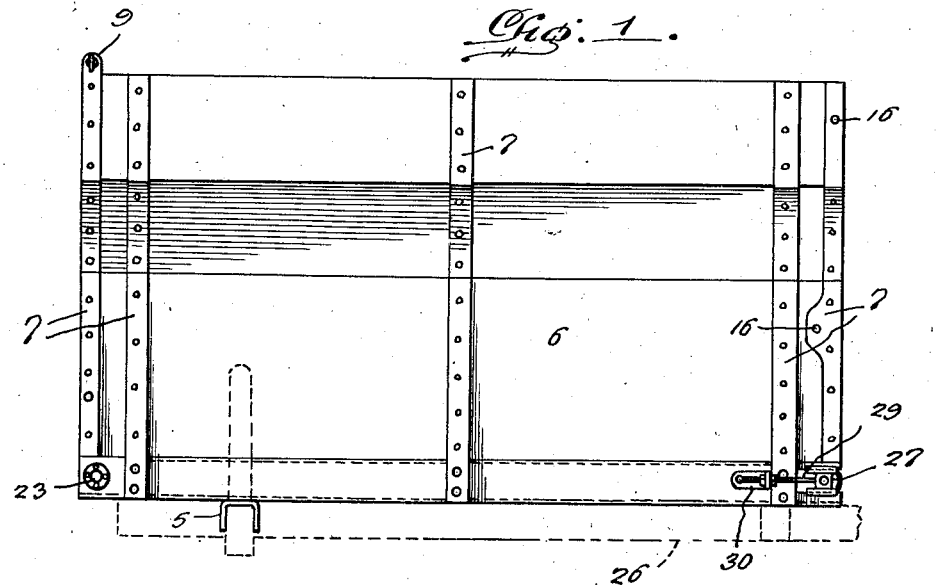
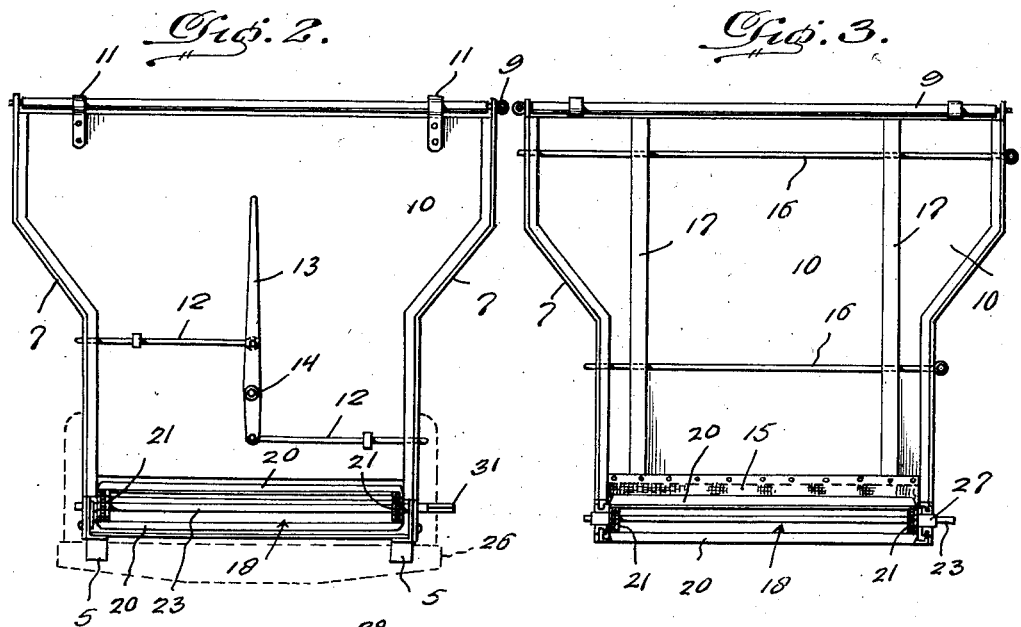
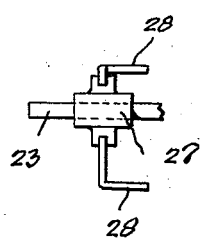
Inventors
Thomas J. Conway,
Alfred B. Buss,
By McMorrow and Berman
Attorneys March 28, 1944.   T. J. CONWAY ET AL   2,345,328
FARM VEHICLE BODY
Filed June 18, 1943   2 Sheets-Sheet 2
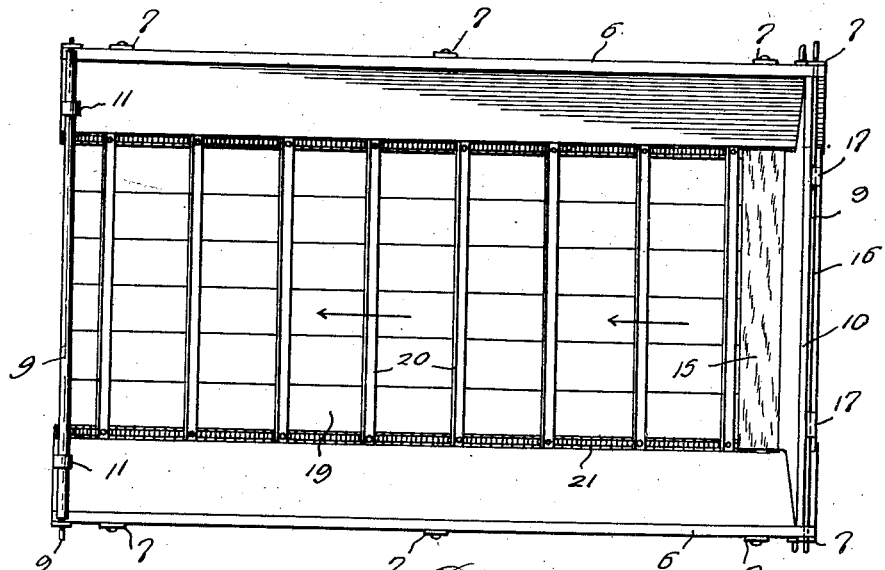
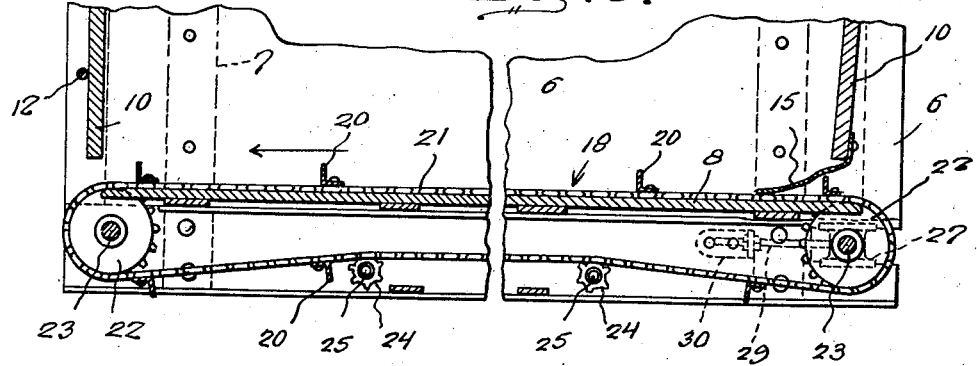
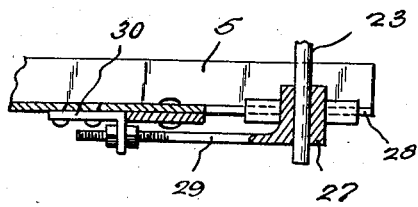
Inventors
Thomas J. Conway,
Alfred B. Buss,
Attorneys Patented Mar. 28, 1944

2,345,328

UNITED STATES PATENT OFFICE 2,345,328

FARM VEHICLE BODY

Thomas J. Conway and Alfred B. Buss, Lake Crystal, Minn.

Application June 18, 1943, Serial No. 491,350

1 Claim. (Cl. 214—83)

This invention relates to a body for farm vehicles and has for the primary object the provision of a device of this character which may be easily installed on the running gear of a farm vehicle now in use and includes means for the easy and quick unloading of material therefrom and which may be operated either by power obtained from a tractor or similar device or by hand power.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a farm wagon body constructed in accordance with our invention.

Figure 2 is a rear end elevation illustrating the body.

Figure 3 is a front end elevation illustrating the body.

Figure 4 is a top plan view showing the body.

Figure 5 is a fragmentary vertical sectional view showing the means of unloading material from the body.

Figure 6 is a fragmentary sectional view showing a conveyor belt adjusting means.

Figure 7 is a fragmentary elevational view showing the means of slidably supporting a bearing forming a part of the conveyor belt tightener.

Referring in detail to the drawings, the numeral 5 indicates stringers employed in the construction of the body and are preferably of angle iron construction and form supports for side panels 6, the latter having secured vertically thereto reinforcing strips 7 which are in turn secured to the stringers 5. The stringers 5 also support a floor or bottom panel 8. The strips 7 located adjacent the ends of the side panels 6 are apertured to receive supporting rods 9 removable therefrom and which carry the end gates 10 located at the front and rear ends of the body. The end gate 10 at the rear end of the body is mounted for swinging movement as shown at 11, and is equipped with latch rods 12 slidable thereon and adapted to enter openings provided in the side panels and some of the strips 7. The latch rods 12 are pivotally connected to an operating lever 13 above and below the pivot point 14 therefor. The control lever 13 is pivotally mounted directly on the last referred to end gate so that the latch rods 12 can be operated to free and secure said end gate whenever desired. The front end gate is supported at an inclination, as shown in Figure 5, and has secured to its lower edge a flexible flap 15.

To secure the said end gate 10 in position, removable rods 16 extend through braces 17 secured vertically to the latter named gate and also pass through the side panels 6 and some of the strips 7 secured thereon.

For the support of material within the body an endless conveyor 18 is provided consisting of an endless apron 19 provided with flights 20 and has secured to the edges thereof endless sprocket chains 21 which are trained over sprocket gears 22 journaled on shafts 23. The upper run of the apron receives the load of material and its direction of travel when operated is toward the rear end gate for the purpose of moving the material out of the body in a rapid manner. The lower run of the apron is supported by sprocket gears 24 mounted on shafts 25 journaled in the stringers 5 for the purpose of supporting the lower run of the endless apron off of the bolsters 26 of the running gear of a farm vehicle of a conventional construction. The flexible flap 15 of the front end gate rides on the upper end of the endless apron for the purpose of preventing the load of material from escaping under the lower edge of the front end gate.

One of the shafts 23 is supported in bearings 27 slidably mounted in guides 28 carried by the stringers 5. The bearings have connected thereto adjusting rods 29 received by brackets 30 mounted on the stringers. The adjusting rods 29 are adjustably connected to the brackets 30 by nuts whereby the bearings 27 may be moved endwise of the stringers 5 to tighten or loosen the apron of the endless conveyor. One of the shafts 23 has its end shaped, as shown at 31, to permit connection thereof to a power source such as the power takeoff of a tractor for operating the endless conveyor or a hand crank may be adapted thereto for the manual operation of the endless conveyor.

The side panels 6 may be shaped as shown in Figures 1 to 3, inclusive, for the purpose of making the lower portion of the body smaller than the upper portion so as to readily fit within the bounds of the running gear of the farm vehicle and still provide as much space as possible within the body to accommodate materials of different kinds.

Thus it will be seen that a very efficient body has been provided for a farm vehicle wherein the material carried thereby can be easily unloaded and within a comparatively short time through the use of power derived from a tractor or similar device or by hand power if desired. Also it will be noted that the rear end gate may be easily and quickly released and swung open to permit the material to pass freely from the endless conveyor while the latter is in operation.

While we have shown and described the preferred embodiment of our invention, it will be understood that minor changes in construction, combination and arrangement of parts may be made without departing from the spirit and scope of the invention as claimed.

Having thus described our invention, what we claim is:

In a wagon body, a frame, vertical sides secured to the frame and each including a pair of vertical portions with one of said portions disposed laterally of the other portion and an inclined portion connecting said pair of vertical portions, front and rear gates matching the shape of said side walls and said rear gate mounted on the side walls for swinging movement and the front gate removably secured to said side walls and inclining toward the rear gate, an endlesss conveyor supported by the frame between the side walls and extending under and beyond the rear gate, a flexible strip secured to the front gate and loosely engaging the conveyor inwardly of one end thereof and between the side walls, and means for releasably securing the rear gate against swinging movement relative to the side walls.

THOMAS J. CONWAY.
ALFRED B. BUSS.